(12) United States Patent
Apte et al.

(10) Patent No.: US 11,868,335 B2
(45) Date of Patent: Jan. 9, 2024

(54) SPACE-EFFICIENT CHANGE JOURNAL FOR A STORAGE SYSTEM

(71) Applicant: DRUVA INC., Sunnyvale, CA (US)

(72) Inventors: Anand Apte, Pune (IN); Alok Kumar, Bihar (IN)

(73) Assignee: Druva Inc., Sunnyvale, CA (US)

( * ) Notice: Subject to any disclaimer, the term of this patent is extended or adjusted under 35 U.S.C. 154(b) by 967 days.

(21) Appl. No.: 16/526,284

(22) Filed: Jul. 30, 2019

(65) Prior Publication Data

US 2020/0372005 A1    Nov. 26, 2020

(30) Foreign Application Priority Data

May 22, 2019    (IN) .............................. 201941020272

(51) Int. Cl.
*G06F 16/23* (2019.01)
*G06F 16/22* (2019.01)

(52) U.S. Cl.
CPC ...... *G06F 16/2358* (2019.01); *G06F 16/2246* (2019.01)

(58) Field of Classification Search
CPC ............. G06F 16/2358; G06F 16/2246; G06F 16/2272
See application file for complete search history.

(56) References Cited

U.S. PATENT DOCUMENTS

| | | | |
|---|---|---|---|
| 8,484,259 B1* | 7/2013 | Makkar | G06F 16/907 707/769 |
| 10,216,432 B1* | 2/2019 | Kulkarni | G06F 11/1471 |
| 10,452,297 B1* | 10/2019 | Karr | H03M 7/3091 |
| 11,023,318 B1* | 6/2021 | Volkov | G06F 16/1805 |
| 2005/0086195 A1* | 4/2005 | Tan | G06F 16/21 |
| 2015/0220650 A1* | 8/2015 | Wang | G06F 16/319 707/711 |
| 2017/0011090 A1* | 1/2017 | Chen | G06F 16/2456 |
| 2017/0075989 A1* | 3/2017 | Sugaya | G06F 16/35 |
| 2017/0270134 A1* | 9/2017 | Solis | G06F 3/0641 |
| 2017/0364414 A1* | 12/2017 | Pogosyan | G06F 16/9027 |
| 2018/0097844 A1* | 4/2018 | Rao | H04L 63/1425 |
| 2019/0332701 A1* | 10/2019 | Rutherglen | G06F 16/245 |
| 2020/0201821 A1* | 6/2020 | Wang | G06F 16/13 |
| 2020/0201822 A1* | 6/2020 | Wang | G06F 16/17 |
| 2020/0341848 A1* | 10/2020 | Meiri | G06F 11/1453 |

* cited by examiner

*Primary Examiner* — Cam Y T Truong
(74) *Attorney, Agent, or Firm* — IceMiller LLP (57) ABSTRACT

A space-efficient change journal for a storage system is provided. The storage system includes a memory having computer readable instructions stored therein. The system further includes a processor configured to access a log structure merge (LSM) tree-based metadata index having metadata for the storage system. The LSM tree-based metadata index includes indices placed in a plurality of indexing layers and one or more indices are merged within the indexing layers in response to updates to metadata, or as a background task. The processor is configured to identify one or more indices of the LSM tree-based metadata index as entries of a change journal of the storage system. The processor is further configured to maintain the change journal of the storage system based upon the identified entries.

11 Claims, 3 Drawing Sheets

SPACE-EFFICIENT CHANGE JOURNAL FOR A STORAGE SYSTEM

PRIORITY STATEMENT

The present application claims priority under 35 U.S.C. § 119 to Indian patent application number 201941020272 filed 22 May 2019, the entire contents of which are hereby incorporated herein by reference.

FIELD

The invention relates generally to data storage and indexing systems, and more particularly to, a space efficient change journal for such data storage and indexing systems.

BACKGROUND

Modern businesses often rely on computer systems and computer networks for data processing. It is undesirable to experience an irretrievable loss of data in such computer systems. To prevent loss of data, computer systems are periodically backed up. As the value and use of data continue to increase, individuals and businesses seek additional ways to process, store and search such data. Such individuals and businesses often employ data storage and handling systems that can process, compile, store, search and/or communicate information or data for business, personal, among other purposes.

Currently, existing file systems such as NTFS, cloud based storages (e.g. Box, Office 365) use hard disk drives to store information and to create index to facilitate searching of information. Storing information in a way that it can be indexed and searched easily and quickly can be substantially expensive. In operation, certain applications may need details of changes in the storage systems in a chronological order. However, such systems require extra storage resources to keep these change entries in a persistent journal. In some cases, change journal entries are stored separately. As a result, duplication of I/O operations occurs that requires additional storage space to be allocated and managed.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a space-efficient change journal for a storage system is provided. The storage system includes a memory having computer-readable instructions stored therein. The storage system further includes a processor configured to execute the computer-readable instructions to access a log structure merge (LSM) tree-based metadata index having metadata for the storage system. The LSM tree-based metadata index includes indices placed in a plurality of indexing layers. Lowest level index is added in response to updates to metadata. One or more lower level indices are merged within the indexing layers to higher level index as a background activity or in response to updates to metadata. The processor is further configured to identify one or more indices of the LSM tree-based metadata index as entries of a change journal of the storage system. Moreover, the processor is further configured to maintain the change journal of the storage system based upon the identified entries.

According to another example embodiment, storage system having a space-efficient change journal is provided. The storage system includes a storage site configured to store a plurality of files received from an application in accordance with a backup schedule of the application. The storage site further includes a metadata repository configured to store metadata associated with each of the plurality of files received from the application. The storage site further includes an indexing module configured to organize the stored metadata using a log structure merge (LSM) tree to generate a LSM tree based metadata index and a change journal having one or more indices of the LSM tree-based metadata index. The storage site also includes a single instance store data repository to store data blocks associated with each of the plurality of the files in de-duplicated form.

According to another example embodiment, a computer-implemented method for maintaining a change journal for a storage site is provided. The method includes accessing a plurality of files stored in a storage site. Each of the plurality of files includes associated metadata. The method includes organizing metadata associated with each of the plurality of files using a log structure merge (LSM) tree to generate a LSM tree based metadata index. The indices of the LSM tree based metadata index are placed in a plurality of indexing layers and the plurality of indexing layers include lower level and upper level indexing layers. The method further includes selectively merging one or more indices of the lower level indexing layers with corresponding indices of upper level indexing layers in response to updates to the metadata associated with each of the plurality of files, or as a background activity. The method also includes maintaining a change journal of the storage site using the indices of the LSM tree based metadata index.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in 'addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The device(s)/apparatus(es), described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments are generally directed to space efficient change journal for storage systems with log structure merge (LSM) tree-based metadata index. The space efficient change journal such as described in the embodiments below facilitates simple and space efficient journal implementation by using the entries of the LSM tree-based metadata index. The techniques described below prevent duplicate input output operations while realizing storage space savings.

Figure 1:
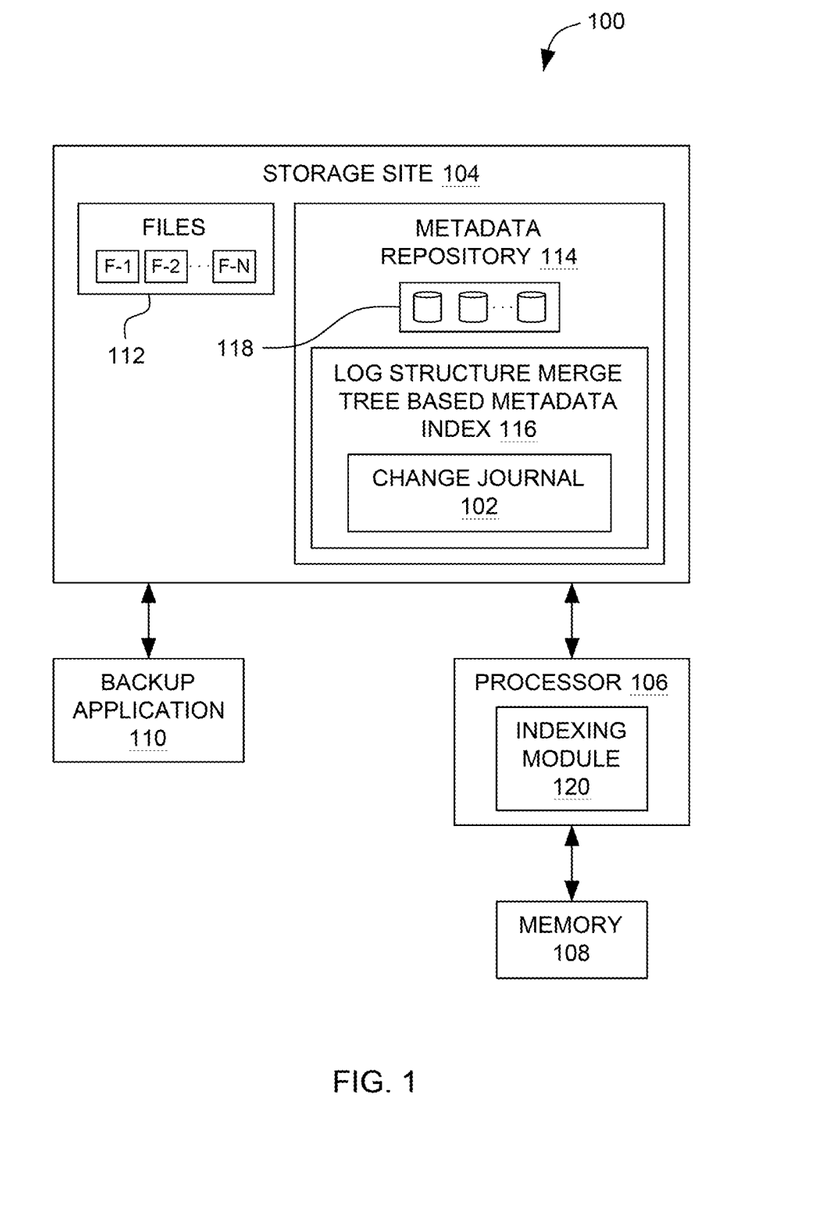
FIG. 1 illustrates a storage system having a space efficient change journal, according to an example embodiment.

FIG. 1 illustrates a storage system 100 having a space efficient change journal 102. The storage system 100 includes a storage site 104, a processor 106, memory 108 and a backup application 110. Examples of the storage system 100 include, but are not limited to, a Direct Attached Storage, Cloud based storage such as S3, or combinations thereof. Each component of the system 100 is described in further detail below.

As illustrated, the storage site 104 is configured to store a plurality of files 112 received from an application such as the backup application 110 in accordance with a backup schedule of the backup application 110. The plurality of files 112 may include documents, emails, conversations, structured records, and the like.

The storage site 104 further comprises a metadata repository 114, the change journal 102 and a log structure merge (LSM) tree based metadata index 116. The metadata repository 114 is configured to store metadata 118 associated with each of the plurality of files 112 stored in storage site 104. For example, metadata 118 may include metadata associated with the plurality of files 112, emails, conversations, structured records, stored in the storage site 104. In some examples, metadata 118 may include a file name, a file path, file size, a file creation/modification timestamp, a checksum (e.g. SHA), a file type, or combinations thereof. In one example, metadata 118 may include data associated with a plurality of emails such as a sender email-id, a receiver email id, email subject, email received timestamp, attachment information, attachment name, size, checksum, or combinations thereof. In one example, metadata 118 may be stored as a part of LSM tree based metadata index 116. Other arrangements of storing metadata 118 may be envisaged.

In some examples, the storage site 104 may include a single instance store data repository (not shown) to store data blocks associated with each of the plurality of files 112 in de-duplicated form. In one example, the single instance store data repository uses block checksums to ensure that only single copy of a data block is stored in the system 100. In operation, the backup application 110 communicates with the storage site 104 to ensure that while block is to be stored, its checksums is compared with SIS, and the corresponding block is uploaded only if it is missing.

In this embodiment, the log structure merge (LSM) tree-based metadata index 116 includes metadata organized using a LSM tree. In the illustrated embodiment, the storage system 100 includes an indexing module 120 configured to organize the stored metadata 118 to generate the LSM tree-based metadata index 116. In one embodiment, the one or more indices of the LSM tree-based metadata index 116 may include information that captures changes made to the index 116 in a chronological order.

In this example, the LSM tree-based metadata index 116 includes indices placed in a plurality of indexing layers. In some examples, one or more indices are merged within the indexing layers in response to updates to metadata 118 stored in the metadata repository 114, or as a background activity. In one example, the plurality of indexing layers includes lower level and upper level indexing layers. In operation, one or more indices of the lower level indexing layers are selectively merged to create corresponding indices of the upper level indexing layers in response to updates to metadata associated with the files.

The processor 106 is communicatively coupled to the storage site 104 and is configured to access the log structure merge (LSM) tree-based metadata index 116 having metadata 114 for the storage system 100. In this example, the indexing module 120 is configured to identify one one or more indices of the LSM tree-based metadata index 116 as entries of the change journal 102 and to maintain the change journal 102 to track the updates to metadata in a chronological order.

The indexing module 120 is further configured to identify one or more indices of the LSM tree-based metadata index 116 as search indices for file search in the storage site 102. In addition, the indexing module 120 is configured to identify one or more indices of the LSM tree-based metadata index to be garbage collected once the indices of lower level indexing layers are merged to create corresponding indices of the higher level indexing layers. In some examples, the indexing module 120 is further configured to retain one or more indices of the LSM tree-based metadata index 116 for a pre-determined time period in accordance with a journal retention policy of the storage site 104. The processor 106 is further configured to garbage collect the identified indices for garbage collection.

Figure 2:
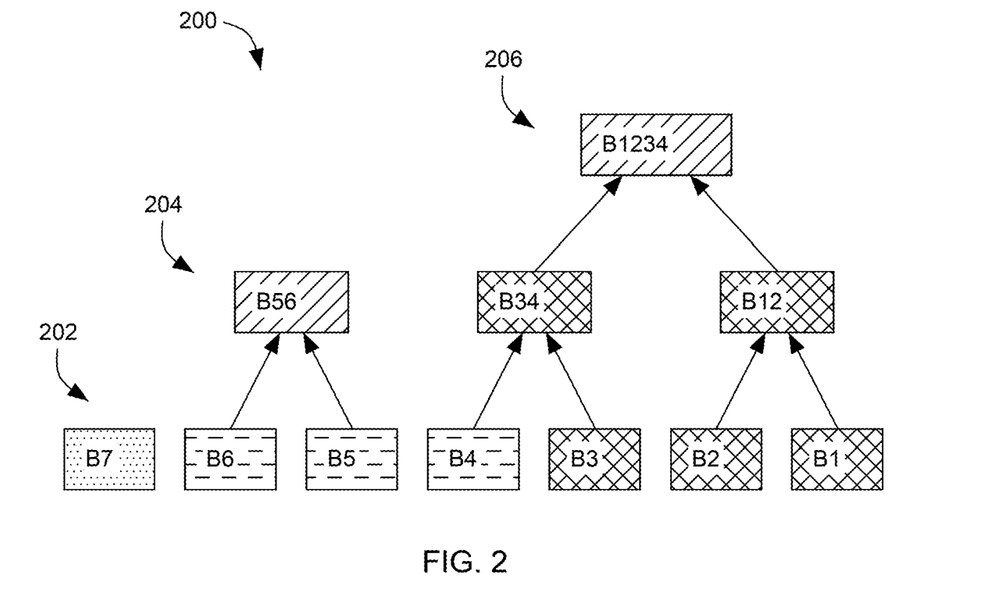
FIG. 2 illustrates an example LSM tree-based metadata index structure of the storage system of FIG. 1, implemented according to the aspects of present technique.

FIG. 2 illustrates an example LSM tree-based metadata index structure 200 of the storage system of FIG. 1, implemented according to the aspects of present technique. In this embodiment, the LSM tree-based metadata index 200 is utilized to maintain a change journal for the system 100. In certain embodiments, other relevant hierarchy structures such as B tree, hash table, or a merge tree may be used for the metadata index 200. The LSM tree-based metadata index 200 includes metadata for the storage system. In this embodiment, the LSM tree structure 200 may be a serialized tree structure that may include a plurality of indexing layers such as generally represented by reference numerals 202, 204 and 206.

The LSM tree structure 200 includes a plurality of indices such as represented by B1, B2, B3 and so forth organized in each of the plurality of indexing layers (202, 204 and 206) of the structure 200. As illiustrated, the indexing layer 202 includes indices represented by B1, B2 . . . B7. In operation, one or more indices of the lower level indexing layers such as 202 are merged with corresponding indices of upper level indexing layers such as 204 and 206 in response to updates to metadata associated with each of the plurality of files stored in the storage system 100, or as a background activity.

In one example, indices such as B2 and B1 are merged to form the entry B12 in the upper indexing layer 204. Similarly, indices such as B5 and B6 are merged to form the entry B56 in the upper indexing layer 204. Moreover, such indices B12 and B34 are merged to form the entry B1234 in the indexing layer 206. In one example, the merge operation of indices of the indexing layers may be a serialized operation.

As an example, a plurality of files such as represented below with their path and size are backed up to the storage site 104 from the backup application 110.

| S. No. | File Path | File Size |
|---|---|---|
| 1 | folder1/file1.doc | 1000 |
| 2 | folder1/file2.txt | 2000 |
| 3 | folder2/file3.pdf, | 150 |
| 4 | folder2/file4.txt | 3000 |

In operation, once the above files are backed up, the following index structure is uploaded to Metadata store (B1):

folder1=>(file1.doc, 1000, cver=1, dver=NA), (file2.txt, 2000, cver=1, dver=NA)

folder2=>(file3.pdf, 150, cver=1, dver=NA), (file4.txt, 3000, cver=1, dver=NA)

Here, cver is 'creation version' and dyer is 'deletion version'. In a subsequent update, file1.doc is modified, file3.pdf is deleted, and a new file (file5.jpg) is added. Following information gets uploaded to Metadata store as part of this backup cycle (B2).

folder1=>(file1.doc, 1000, cver=1, dver=2), (file1.doc, 1200, cver=2, dver=NA)

folder2=>(file3.pdf, 150, cver=1, dver=2)

folder3=>(file5.jog, 4000, cver=2, dver=NA)

As can be seen, such information described above precisely captures changes happening to the metadata during this backup cycle. In operation, the information in block B2 is merged with information in block B1. After the merge operation, the index structure (block B12) will be as below:

folder1=>(file1.doc, 1000, cver=1, dver=2), (file1.doc, 1200, cver=2, dver=NA), (file2.txt, 2000, cver=1, dver=NA)

folder2=>(file3.pdf, 150, cver=1, dver=2), (file4.txt, 3000, cver=1, dver=NA)

folder3=>(file5.jog, 4000, cver=2, dver=NA)

As can be seen, the above structure cumulatively captures the current state of the system. It should be noted that the two entries for file1.doc, cver=1 and file3.pdf, cver=1 have been merged.

As described with reference to FIG. 1, one or more indices of the LSM tree based metadata index 200 are identified as search indices for file search in the storage site 102. In this example, indices needed for file search operation are identified as B1234, B56 and B7 as rest of the indices have already been merged to indices in the upper indexing layers like 204 and 206. Moreover, the indices B4, B5 and B6 are identified as entries for the change journal as these indices contain information corresponding to the changes. Moreover, index B7 is identified as index required for search and journal and other indices such as B1, B2, B3, B12 and B34 are identified for garbage collection. The processor 104 is further configured to garbage collect the identified indices for freeing up space. Such indices may be garbage collected immediately after they are merged to form the higher level index.

In this example, indices B4, B5, B6, and B7 are required for the change journal as per journal retention policy. Accordingly, such indices may be retained although some of these indices may not be required for index search operations.

Figure 3:
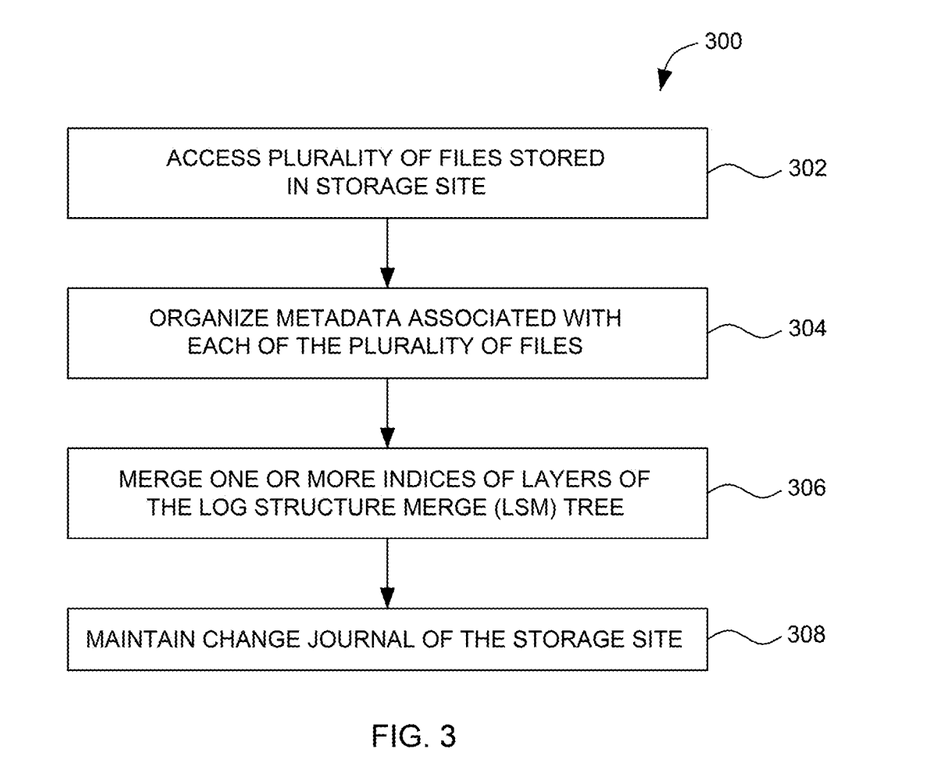
FIG. 3 is flow diagram for illustrating a process 300 for maintaining a change journal for a storage site, using the storage system 100 of FIG. 1, according to the aspects of the present technique.

FIG. 3 is flow diagram for illustrating a process 300 for maintaining a change journal for a storage site, using the storage system 100 of FIG. 1, according to the aspects of the present technique.

At step 302, a plurality of files stored in a storage site are accessed. Each of the plurality of files comprises associated metadata. The plurality of files may be accessed from a memory device configured to store the files.

At step 304, metadata associated with each of the plurality of files is organized using a log structure merge (LSM) tree to generate a LSM tree based metadata index. Further, the indices of the LSM tree based metadata index are placed in a plurality of indexing layers and the plurality of indexing layers comprise lower level and upper level indexing layers. In one example, the metadata associated with each of the plurality of files comprises a file name, a file path, timestamp, or combinations thereof.

At step 306, one or more indices of the lower level indexing layers are selectively merged to create corresponding indices of upper level indexing layers. In an embodiment, indices are merged in response to updates to the metadata associated with each of the plurality of files, or as a background activity. In one embodiment, the one or more indices of the LSM tree based metadata index may be identified as search indices for file search in the storage site. Further, in this embodiment, the one or more indices of the LSM tree based metadata index are identified corresponding to the change journal of the storage site.

In one example, the one or more indices of the LSM tree-based metadata index are identified for garbage collection once the indices of lower level indexing layers are merged to create corresponding indices of the higher level indexing layers.

At step 308, a change journal of the storage site is maintained, using the indices of the LSM tree based metadata index. In one embodiment, the change journal is maintained to track updates to metadata in a chronological order. Furthermore, the change journal may be utilized to track the changes in the storage site and retaining one or more indices based upon the change journal policy of the storage site.

The modules of the storage system 100 having a space efficient change journal 102 described herein are implemented in computing devices. One example of a computing device 400 is described below in FIG. 4. The computing device includes one or more processor 402, one or more computer-readable RAMs 404 and one or more computer-readable ROMs 406 on one or more buses 508. Further, computing device 400 includes a tangible storage device 410 that may be used to execute operating systems 420 and the storage system 100. The various modules of the storage system 100 include a storage site 104, a processor 106, memory 108 and a backup application 110. The processor 106 further includes an indexing module 120. Both, the operating system 420 and the storage system 100 are executed by processor 402 via one or more respective RAMs 404 (which typically includes cache memory). The execution of the operating system 420 and/or the system 100 by the processor 402, configures the processor 402 as a special purpose processor configured to carry out the functionalities of the operation system 420 and/or the storage system 100, as described above.

Figure 4:
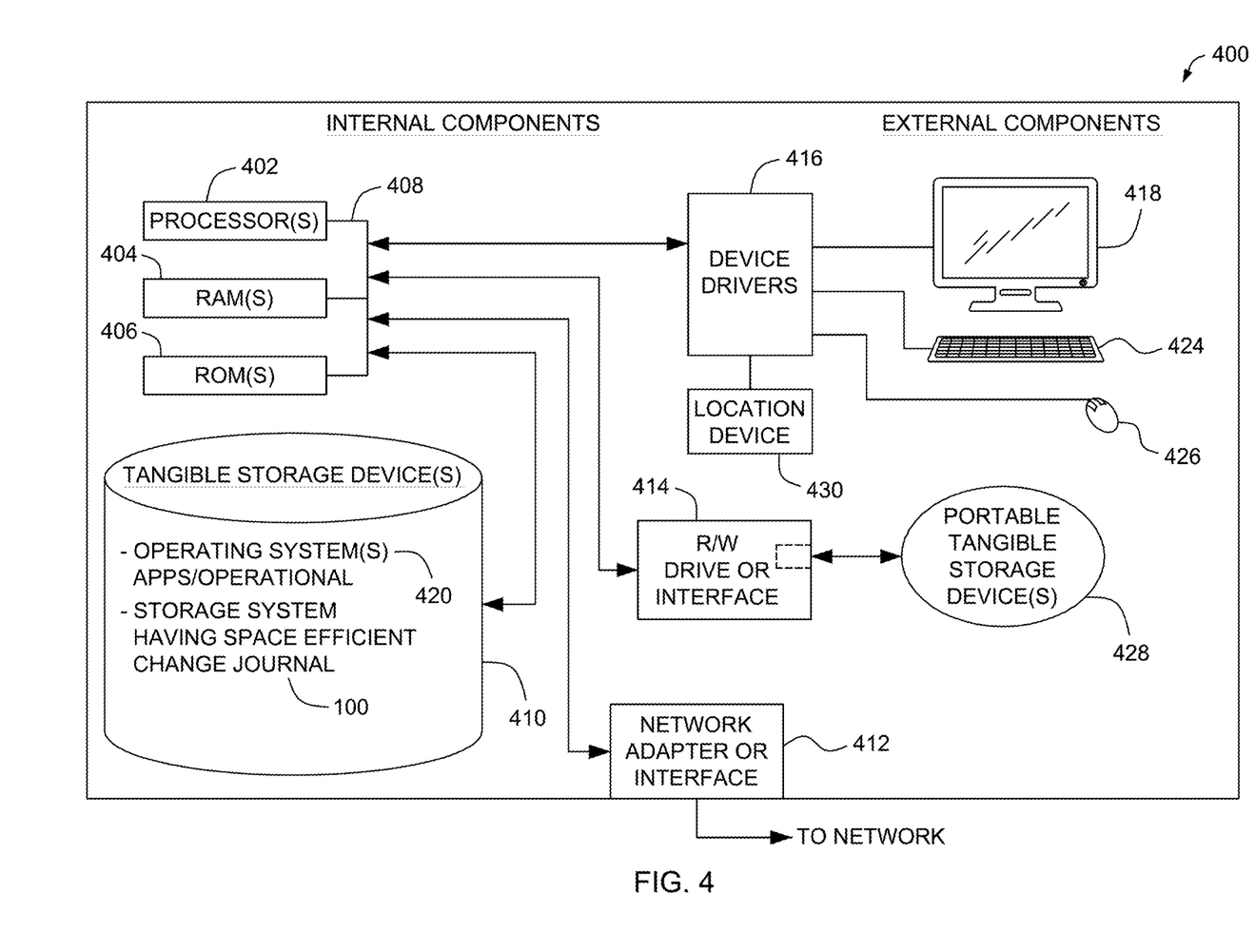
FIG. 4 is a block diagram of an embodiment of a computing device in which the modules of the storage system having a space efficient change journal, described herein, are implemented.

Examples of storage devices 410 include semiconductor storage devices such as ROM 506, EPROM, flash memory or any other computer-readable tangible storage device that may store a computer program and digital information.

Computing device also includes a R/W drive or interface 414 to read from and write to one or more portable computer-readable tangible storage devices 428 such as a CD-ROM, DVD, memory stick or semiconductor storage device. Further, network adapters or interfaces 412 such as a TCP/IP adapter cards, wireless Wi-Fi interface cards, or 3G or 4G wireless interface cards or other wired or wireless communication links are also included in computing device.

In one example embodiment, the storage system 100 which includes a storage site 102, a processor 104, memory 106 and a backup application 108, may be stored in tangible storage device 410 and may be downloaded from an external computer via a network (for example, the Internet, a local area network or other, wide area network) and network adapter or interface 412.

Computing device further includes device drivers 416 to interface with input and output devices. The input and output devices may include a computer display monitor 418, a keyboard 424, a keypad, a touch screen, a computer mouse 426, and/or some other suitable input device.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure.

Still further, any one of the above-described and other example features of example embodiments may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer-device to perform any one of the aforementioned methods. Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it may be separated from the computer device main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The invention claimed is:

1. A change journal for a storage system, the storage system comprising:
  a memory having computer-readable instructions stored therein;
  a processor configured to execute the computer-readable instructions to:
  store, in storage site, metadata of a plurality of files and the plurality of files received from an application in accordance with a backup schedule of the application;
  organize the stored metadata of the plurality of files using a log-structured merge-tree (LSM tree);
  access the log-structured merge-tree (LSM tree) that comprises a first plurality of first indices placed in a plurality of indexing layers, wherein a second plurality of the first indices in one indexing layer of the indexing layers is merged, in response to updates to the metadata, into another index at a higher indexing layer of the indexing layers than the one indexing layer, and wherein a third plurality of the first indices is (i) at a lowest one indexing layer of the indexing layers and (ii) created in response to a respective update for the change journal;
  identify one or more first indices of the first plurality of first indices not needed for the change journal, in accordance with a retention policy; and
  maintain, using garbage collecting the identified one or more first indices, the change journal of the storage site to track updates to the stored metadata of the plurality of files in a chronological order.

2. The change journal of claim 1, wherein the LSM tree is used to store metadata associated with a plurality of files, emails, conversations, structured records or combinations thereof.

3. The change journal of claim 2, wherein one or more indices are merged in response to a background activity.

4. The change journal of claim 2, wherein the metadata comprises a file name, a file path, file size, creation timestamp, modification timestamp, checksum, file type, or combinations thereof.

5. The change journal of claim 1, wherein the storage system comprises direct attached storage, cloud based storage, or combinations thereof.

6. The change journal of claim 1, wherein the third indices are created in a chronological order.

7. The change journal of claim 1, wherein the LSM tree is stored in one or more of direct attached storage, a storage area network (SAN), network attached storage (NAS), cloud storage, or combinations thereof.

8. A storage system having a change journal, the storage system comprising:
  a storage site configured to store a plurality of files received from an application in accordance with a backup schedule of the application, wherein the storage site comprises:
  a memory configured to store metadata of each file of the plurality of files received from the application; and
  an indexing unit configured to:
  organize the stored metadata using a log-structured merge-tree (LSM tree);
  access the log-structured merge-tree (LSM tree) that comprises a first plurality of first indices placed in a plurality of indexing layers, wherein a second plurality of the first indices in one indexing layer of the indexing layers is merged, in response to updates to the metadata, into another index at a higher indexing layer of indexing layers than the one indexing layer, and wherein a third plurality of the first indices is (i) at a lowest indexing layer of the indexing layers and (ii) created in response to a respective update for the change journal;
  identify one or more first indices of the first plurality of the first indices not needed for the change journal, in accordance with a retention policy; and
  maintain, using garbage collecting the identified one or more first indices, the change journal of the storage site to track updates to the stored metadata of the plurality of files in a chronological order.

9. The storage system of claim 8, wherein the garbage collection is performed after the merging.

10. The storage system of claim 8, wherein the metadata comprises a file name, a file path, timestamp, or combinations thereof.

11. A computer-implemented method for maintaining a change journal for a storage site, the method comprising:
  accessing, by a processor, a plurality of files stored in a storage site in accordance with a backup schedule of an application, wherein each file of the files comprises stored metadata in a storage site;
  organizing, by the processor, stored metadata of the plurality of files using a log-structured merge-tree (LSM tree);
  accessing, by the processor, the LSM tree that comprises a first plurality of first indices placed in a plurality of indexing layers, wherein a second plurality of the first indices in one indexing layer of the indexing layers is merged, in response to updates to the metadata, into another index at a higher indexing layer than the one indexing layer, and wherein a third plurality of the first indices is (i) at a lowest one indexing layer of the indexing layers and (ii) created in response to a respective update for the change journal;

identifying, by the processor, one or more first indices of the first plurality of first indices not needed for the change journal, in accordance with a retention policy; and maintain, by the processor using garbage collecting the identified one or more first indices, the change journal of the storage site to track updates to the stored metadata of the plurality of files in a chronological order.

\* \* \* \* \*